(12) United States Patent
Bennett, Jr.

(10) Patent No.: US 6,951,403 B2
(45) Date of Patent: Oct. 4, 2005

(54) DEVICE FOR ILLUMINATING A GENERALLY FLAT SURFACE

(75) Inventor: James F. Bennett, Jr., Charlotte, NC (US)

(73) Assignee: LightWedge, LLC, Nantucket, MA (US)

(*) Notice: Subject to any disclaimer, the term of this patent is extended or adjusted under 35 U.S.C. 154(b) by 136 days.

(21) Appl. No.: 10/127,883

(22) Filed: Apr. 23, 2002

(65) Prior Publication Data

US 2003/0081407 A1 May 1, 2003

Related U.S. Application Data

(63) Continuation-in-part of application No. 10/039,670, filed on Oct. 26, 2001.

(51) Int. Cl.[7] .............................. A47B 19/00; G02B 7/02
(52) U.S. Cl. .............................. 362/98; 362/31; 362/27; 359/802
(58) Field of Search .............................. 362/98, 99, 31, 362/555, 558, 26, 33, 97; 40/546, 547; 359/798, 642, 802, 811

(56) References Cited

U.S. PATENT DOCUMENTS

| 1,556,510 A | 10/1925 | King |
| 2,122,753 A | 7/1938 | Ridabock ........................ 88/39 |
| 2,744,192 A | 5/1956 | Rosenthal ..................... 240/81 |

(Continued)

FOREIGN PATENT DOCUMENTS

GB    1232977    5/1971

*Primary Examiner*—Ali Alavi
(74) *Attorney, Agent, or Firm*—Nixon Peabody LLP; Tim L. Brackett, Jr.

(57) ABSTRACT

A device for illuminating a generally flat surface essentially without emitting significant light beyond the surface is particularly adapted for use as a book light. The device comprises a battery-operated light source contained within a housing to which a transparent light-conductive illuminating body is mounted in close adjacency to the light source to transmit the light through the illuminating body. The device may be placed with the illuminating body over a book or other flat surface for illuminated viewing through the transparent illuminating body. The illuminating body is tapered in a wedge shape to deflect the conducted light onto the underlying surface.

15 Claims, 3 Drawing Sheets

U.S. PATENT DOCUMENTS

| | | | | |
|---|---|---|---|---|
| 2,771,003 A | | 11/1956 | Lyndall et al. | 88/39 |
| 2,803,919 A | | 8/1957 | Abraham | 45/57 |
| D217,506 S | | 5/1970 | Knoetgen | D16/8 |
| 3,793,058 A | * | 2/1974 | Rostoker | 220/2.1 R |
| 3,808,415 A | * | 4/1974 | Hurst | 362/31 |
| 4,388,678 A | | 6/1983 | Turner | 362/293 |
| 4,432,042 A | | 2/1984 | Zeller | 362/183 |
| 4,598,340 A | | 7/1986 | Dwosh et al. | 362/98 |
| 4,680,681 A | | 7/1987 | Fisherman et al. | 362/98 |
| 4,751,615 A | * | 6/1988 | Abrams | 362/31 |
| 4,833,443 A | | 5/1989 | Siew | 340/473 |
| 5,163,748 A | | 11/1992 | Messinger | 362/98 |
| 5,183,324 A | | 2/1993 | Thomas | 362/103 |
| 5,280,415 A | * | 1/1994 | Barnette | 362/31 |
| 5,280,416 A | | 1/1994 | Hartley et al. | 362/98 |
| 5,337,224 A | | 8/1994 | Field et al. | 362/84 |
| 5,381,310 A | | 1/1995 | Brotz | 362/32 |
| 5,412,896 A | | 5/1995 | Morgan | 43/4 |
| 5,442,528 A | | 8/1995 | Vandenbelt | 362/98 |
| 5,471,347 A | * | 11/1995 | Galiani | 359/807 |
| 5,499,165 A | * | 3/1996 | Holmes, Jr. | 362/31 |
| D372,924 S | | 8/1996 | Fisherman | D16/135 |
| 5,639,156 A | | 6/1997 | Broxson | 362/99 |
| 5,695,271 A | | 12/1997 | Zeller | 362/98 |
| 5,764,493 A | | 6/1998 | Liao | 362/31 |
| 5,813,748 A | | 9/1998 | Maxymych | 362/154 |
| D401,371 S | | 11/1998 | Chen | D26/38 |
| 5,860,722 A | | 1/1999 | Tai et al. | 362/31 |
| 5,915,855 A | | 6/1999 | Murase et al. | 40/546 |
| 5,921,664 A | | 7/1999 | Lee | 362/296 |
| D414,574 S | | 9/1999 | Chen | D26/37 |
| 6,022,119 A | | 2/2000 | Booty, Jr. | 362/98 |
| 6,073,374 A | | 6/2000 | Tingmo | 40/546 |
| 6,076,294 A | | 6/2000 | Durbin | 40/544 |
| D433,170 S | | 10/2000 | Chan | D26/38 |
| 6,213,618 B1 | | 4/2001 | Dobbin et al. | 362/99 |
| 6,305,109 B1 | | 10/2001 | Lee | 40/546 |
| 6,454,423 B1 | * | 9/2002 | Suzuki et al. | 362/31 |

\* cited by examiner

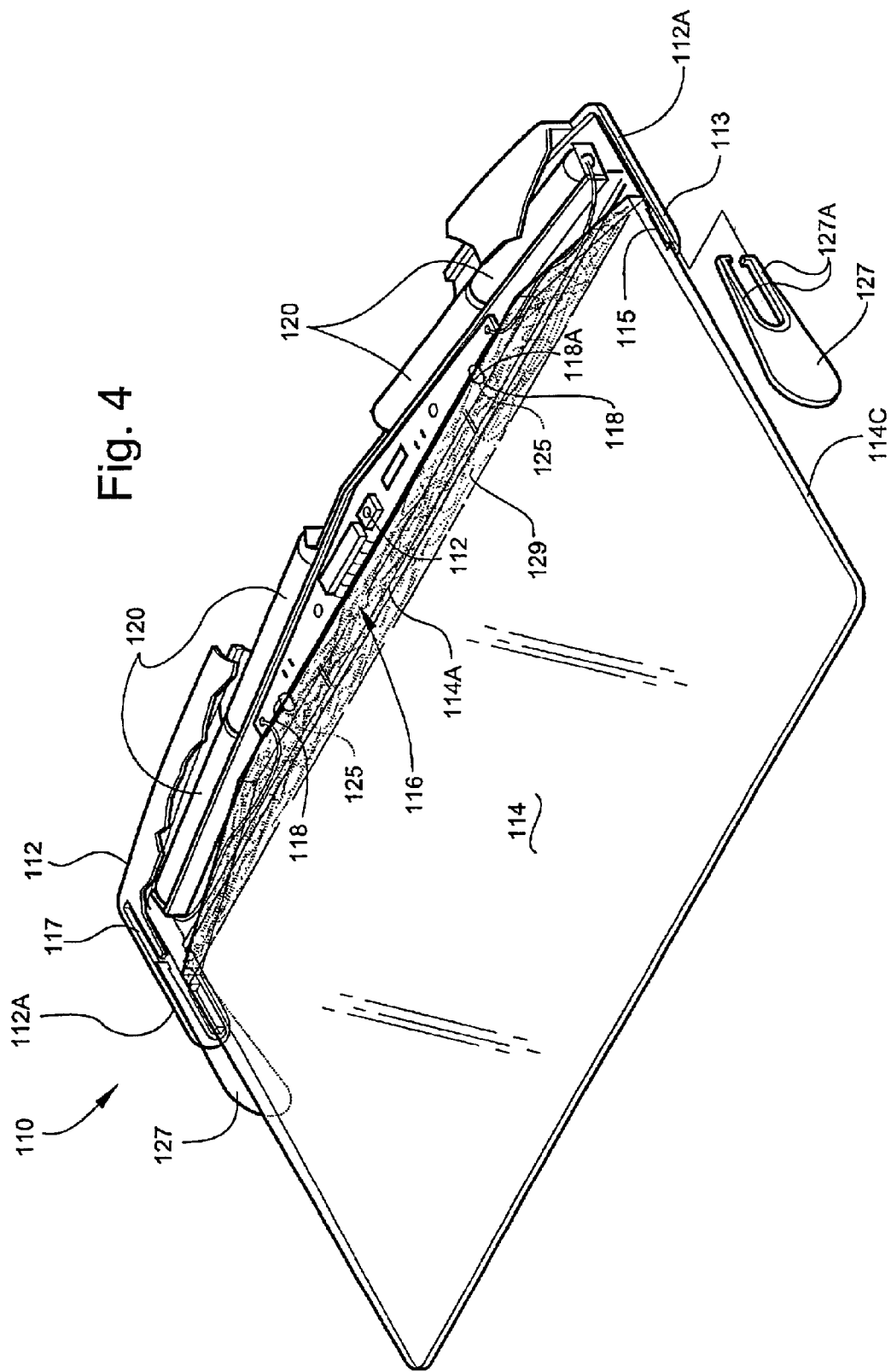

DEVICE FOR ILLUMINATING A GENERALLY FLAT SURFACE

CROSS-REFERENCE TO RELATED APPLICATIONS

This is a continuation-in-part of U.S. patent application Ser. No. 10/039,670, filed Oct. 26, 2001, entitled "Device for Illuminating a Generally Flat Surface," copending herewith.

BACKGROUND OF THE INVENTION

The present invention relates generally to portable lights and like illuminating devices and, more particularly, to a portable illuminating device adapted for illuminating a generally flat surface, such as a page of a book, with minimal or at least reduced emission of significant light beyond the surface being illuminated.

Portable illuminating devices are well known and have various and sundry configurations and potential uses. One type of such device is commonly referred to as a book light and essentially comprises a small light weight portable light-generating lamp adapted to be attached or otherwise supported in close proximity to a book, magazine or the like being read, so as to illuminate the pages thereof. Representative examples of such book lights are disclosed in U.S. Pat. Nos. 4,432,042; 4,598,340; 4,680,681; 5,280,416; 5,442,528; 5,695,271; 5,921,664; Des. 414,574; 6,022,119; and 6,213,618. Typically, such devices are intended to direct a targeted beam of light only at the reading material so as to minimize or avoid altogether inconveniencing or bothering others. Thus, one use promoted for such book lights is for reading in bed without the necessity of utilizing a table lamp so as to avoid interfering with a partner's ability to sleep.

While such book lights are generally effective for such purpose, the known devices are still inconvenient in that the light, although of lesser lumens than table lamps, still is emitted in an undiffused manner and may still bother others in the vicinity. Attaching the devices to books or magazines is also sometimes inconvenient and unwieldy despite the small size and light weight of such devices.

SUMMARY OF THE INVENTION

Accordingly, it is an object of the present invention to develop a device for illuminating any generally flat surface with minimal or at least reduced emission of significant light beyond the surface, such as a page of a book being read, so as to overcome the disadvantages of the known portable lights and illuminating devices described above.

Briefly summarized, the present invention accordingly provides an illuminating device basically comprising a light source and an illuminating body for generally overlying the surface to be illuminated. The illuminating body comprises a light conductive material configured to receive and deflect light from the light source onto the underlying surface being illuminated.

In a preferred embodiment, the illuminating device of the present invention is dimensioned and configured to overlie and illuminate a page of a book for reading in the absence of other light. For this purpose, the illuminating body is formed of a transparent light conductive material generally in a wedge-shape tapering from an enlarged edge for receiving and conducting light into and through the illuminating body and deflecting the light onto the page to be illuminated. The light source along with a battery for powering the light source are contained in a housing secured to and supporting the enlarged edge of the illuminating body in close light-receiving proximity to the light source. The housing and the illuminating body may have mating projections and receptacles for securing them together. It is also advantageous to provide an abutment attachable to the illuminating body for engagement against a book or the like in order to rest the illuminating device in overlying relation to the page or other surface being illuminated.

Preferably, the light source may be one or more light bulbs, e.g. LEDs, with the illuminating body preferably being formed with a corresponding number of recesses configured compatibly with the light bulb to closely receive and substantially surround the bulb in order to cause the light transmitted from the light bulb or bulbs three-dimensionally into and through the illuminating body. It is further preferred that the light bulb have a frosted globe, and that the end edge of the illuminating body into which the bulb is received also be textured, for assisting in diffusing the light from the bulb.

BRIEF DESCRIPTION OF THE DRAWINGS

FIG. 4 is a perspective view of an illuminating device in accordance with a second preferred embodiment of the present invention, shown with the housing thereof partially broken away.

DETAILED DESCRIPTION OF THE PREFERRED EMBODIMENT

Figure 1:
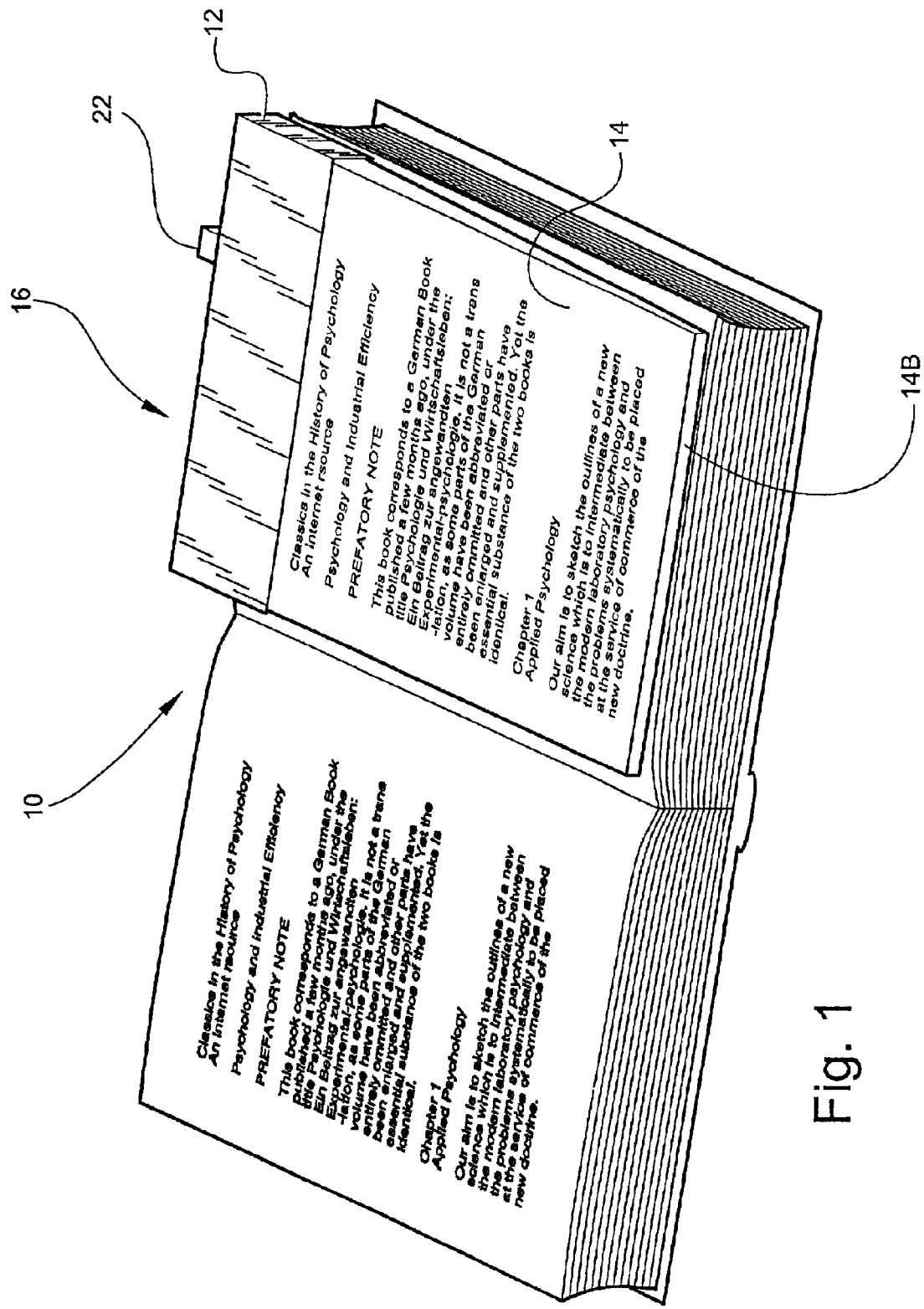
FIG. 1 is a perspective view of an illuminating device in accordance with a preferred embodiment of the present invention, shown in use overlying a page of a book being read so as to illuminate the page.

Referring now to the accompanying drawings and initially to FIG. 1, an illuminating device in accordance with a preferred embodiment of the present invention adapted particularly for use as a book light is indicated in its totality at 10. The illumination device 10 basically comprises a housing 12 which supports an illuminating body 14 extending outwardly from the housing 12, and also contains an arrangement suitable for generating a source of light, indicated overall at 16.

The illuminating body 14 fundamentally is contemplated to comprise a transparent body formed of a material capable of conducting light and dimensioned and configured to overlie the item intended to be illuminated, e.g., in a rectangular shape in front elevation corresponding to a typical page of a published book. As is known, certain thermoplastic resins, such as various acrylic and polycarbonate resins, have the inherent capability of conducting light throughout the material and, hence, it is contemplated and preferred that the illuminating body 14 be fabricated of such material, although the present invention is not intended to be limited to these materials but can potentially utilize any illuminating body made of any other transparent material capable of conducting light. Advantageously, the illuminating body is further configured to deflect a substantial portion of the conducted light within the illuminating body 14 onto the underlying book page or other surface to be illuminated. For this purpose, the illuminating body 14 is preferably formed in a wedge shape tapering from an enlarged end 14A narrowingly to an edge 14B of a substantially reduced cross-sectional thickness at the opposite end of the illuminating body 14.

The housing 12 preferably is substantially hollow in order to receive and secure the enlarged end 14A of the illuminating body 14, e.g., by screws and other fastening means (not shown), and also to contain the light source arrangement 16 in immediate adjacency to the enlarged end 14A. The housing 12 preferably is configured as compactly as possible to occupy a minimal portion of the front elevational surface area of the illuminating device 10, but in the accompanying drawings the housing 12 is illustrated more schematically and on a more enlarged scale for better clarity and understanding of the individual components of the illuminating device 10.

The light source arrangement 16 may comprise any suitable combination of components capable of generating visible light and applying such light to the enlarged end 14A of the illuminating body 14 contained within the housing 12 so as to conduct the light into and through the illuminating body 14. By way of example, but without limitation, the light source arrangement 16 may comprise a common miniature light bulb 18 supported centrally within the housing 12 immediately adjacent the enlarged end 14A of the illuminating body 14 and connected in series with a storage battery 20 and a manual on-off switch 22 by a simple DC-form of electrical wiring circuit, indicated generally at 24, for selective energization and deenergization of the light bulb 18.

The operation of the illuminating device 10 may thus be readily understood. Upon manual actuation of the switch 22 to close the electrical circuit 24, the battery 20 supplies electrical power to the light bulb 18, thereby energizing the light bulb 18 to emit visible light. Because the housing 12 is enclosed and preferably fashioned of an opaque material, the emitted light is contained within the housing and, due to the immediate proximity of the light bulb 18 to the enlarged end 14A of the illuminating body 14, the light is substantially conducted into and through the illuminating body 14 toward the opposite narrowed end edge 14B. However, because of the tapering wedge shape of the illuminating body 14, a substantial amount of the conducted light is deflected downwardly and emitted from the underside of the illuminating body 14. Thus, with the illuminating device 10 placed in overlying relation to a generally flat surface, such as a page of a book, as depicted in FIG. 1, the light conducted within the illuminating body 14 is substantially applied directly and primarily to the underlying surface, thus readily facilitating illuminated viewing of the surface through the transparent body 14.

Figure 2:
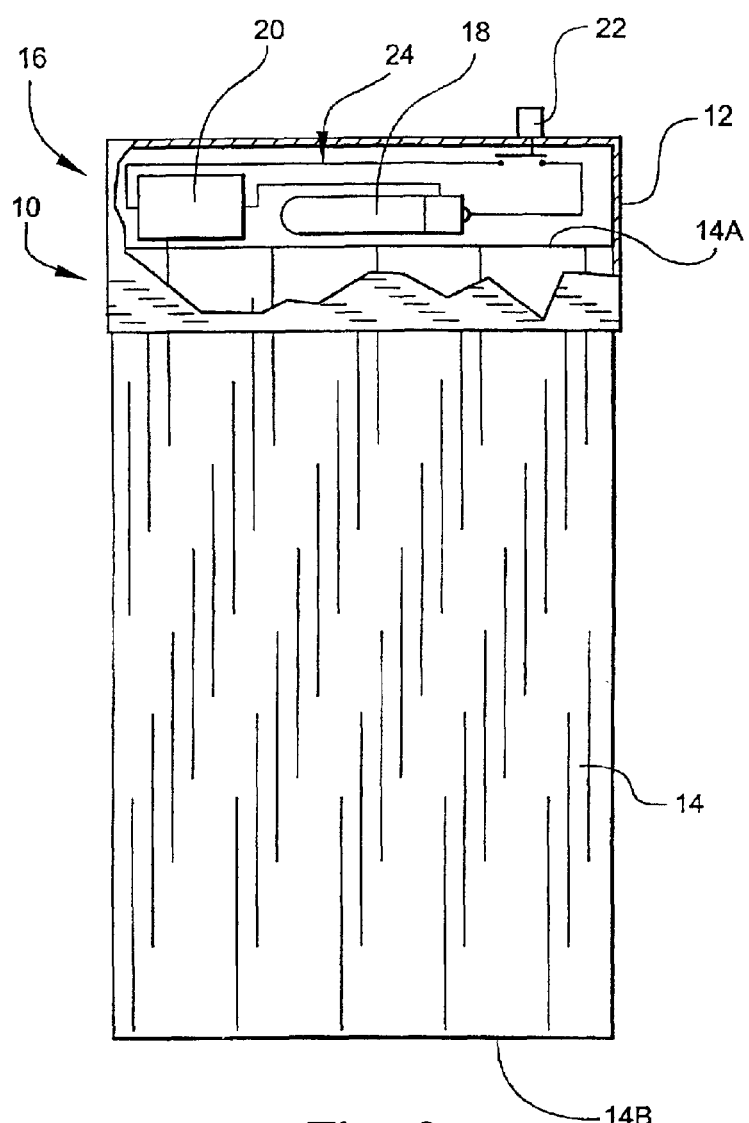
FIG. 2 is a front elevational view of the illuminating device of FIG. 1, with the housing thereof partially in cross-section.
Figure 3:
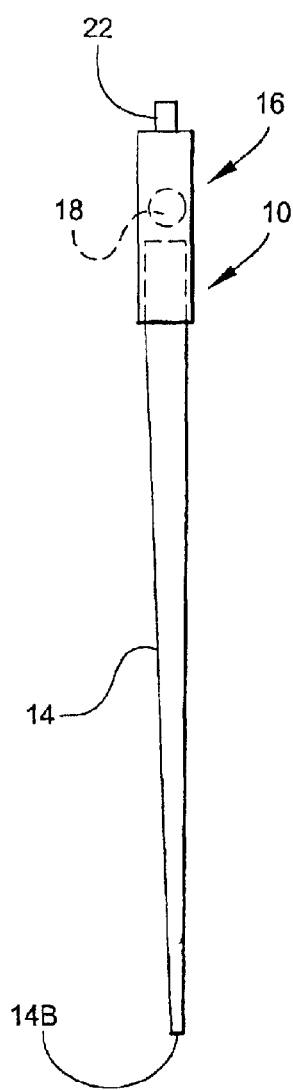
FIG. 3 is a side elevational view of the illuminating device of FIGS. 1 and 2.

With reference now to FIG. 4, a second contemplated embodiment of an illuminating device according to the present invention is shown in a perspective view and indicated in its totality at 110. As with the embodiment of FIGS. 1–3, the illumination device 110 basically comprises a housing 112 which supports a rectangularly wedge-shaped illuminating body 114 formed of a suitable light-conductive thermoplastic resin. In FIG. 4, the housing 112 of the illumination device 110 is partially broken away to reveal the operative internally-supported light generating arrangement 116. Basically, the light generating arrangement 116 comprises a miniature circuit board which supports a pair of miniature LED-type light bulbs 118 in laterally spaced arrangement, a pair of ordinary dry cell batteries 120, and a manual on-off switch 122. In this embodiment, the light bulbs 118 project directly and snugly into correspondingly spaced and configured bores 125 formed in the immediately adjacent enlarged end 114A of the illuminating body 114. Advantageously, in this manner, the light bulbs 118 are completely surrounded by the resinous material of the illuminating body 114 whereby the light transmitted by the bulbs is effectively conducted into the body 114 three-dimensionally, i.e., longitudinally in the lengthwise direction of the body, laterally in the widthwise direction of the body, and transversely in the direction of the body's thickness. In turn, the internal deflection of the conducted light within the illuminating body 114 is enhanced over that accomplished by a light bulb merely being oriented adjacent, so as to be shown at, the enlarged end 114A of the illuminating body 114. It is further contemplated in this embodiment that the outer globe 118A of each light bulb 118 should have a frosted or otherwise textured surface effect so as to the diffuse the transmitted light and prevent any tendency of the light to conduct in noticeable streaks or beams. In conjunction therewith, the edge of the enlarged end 114A, the interior surfaces of the bulb—receiving bores 125, as well as a portion of the front and rear faces, of the illuminating body 114, are textured, as indicated at 129, to further enhance diffusion of the emitted light from the bulbs.

According to another feature of the illuminating device 110 in the embodiment of FIG. 4, the housing 112 includes lateral arms 112A which enclose and project partially along the opposite lateral side edges 114C of the illuminating body 114 adjacent its enlarged end 114A. In conjunction therewith, the side edges 114C of the illuminating body 114 are formed with laterally projecting ears 115, which are received snugly in recessed receptacles 113 formed in the arms 112A of the housing 112. The mating engagement of the ears 115 of the illuminating body 114 in the receptacle recesses 113 of the housing 112 effectively enhances the securement of the housing 112 with the illuminating body 114. Additionally, the projecting arms 112A of the housing 112 are configured with lengthwise channels 117 along the front and back sides of the arms 112A to matingly receive in removable fashion opposing legs 127A of abutment devices 127. When thusly secured in place on the arms 112A, the abutment devices 127 form forwardly and rearwardly projecting flanges along the side edges 114C of the illuminating body 114 which can function as rests to engage against a book or other item to be illuminated so as to hold the illuminating device in overlying relation thereto.

Persons skilled in the relevant art will readily recognize and understand that the present invention is susceptible to numerous embodiments, uses and modifications beyond the specific form of book light disclosed and illustrated herein. Fundamentally, the illuminating device 10 of the present invention may be embodied in various sizes and configurations as suitable for use in illuminating virtually any generally flat surface in virtually any application wherein it is desirable to avoid emitting any significant quantity of the conducted light beyond the underlying surface to be illuminated and viewed. For example, alternative embodiments for military and/or industrial applications and uses are contemplated to be possible. It may also be desirable, both for the specific book light embodiment disclosed herein and various other embodiments, that the illuminating body 14 be formed of a tapered shape other than a wedge but equally capable of deflecting light onto an underlying surface or may be formed of a convex or other suitable shape to magnify any surface over which the device is placed. Similarly, it is contemplated that the housing 12 may be equipped or configured with a clip-like or similar device capable of engaging over a book so as to facilitate hands-free retention of the device in place overlying a page of a book. These and other embodiments, applications and modifications of the present invention are contemplated to be within the scope and substance of the invention.

The advantages of the present invention over known forms of book lights and other illuminating devices will be readily apparent. The device is simple and easy to use and effectively focuses the majority of the emitted light directly on the surface to be illustrated with minimal emission of light beyond the surface so as to avoid interfering with or bothering other persons in the vicinity. Because the present invention does not suffer the disadvantage of diffusion of the emitted light away from the illuminated surface, the present invention may potentially illuminate as effectively as or better than conventional devices while utilizing a smaller and lower wattage bulb than conventional lights, thereby realizing an increased battery life in contrast to known devices.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A device for illuminating a generally flat surface essentially without emitting significant light beyond the surface, the device comprising:
    a light source,
    an illuminating body for generally overlying the surface being illuminated, and
    a housing containing the light source and supporting the illuminating body and the light source in assembly with one another,
    the body comprising a transparent light conductive material configured to receive and deflect light from the light source onto the surface being illuminated and having a generally tapering wedge-shape,
    the body defining a recess bore extending from an enlarged end of the body in the direction of the taper of the body for receiving and essentially surrounding the light source for transmitting the light from the light source three-dimensionally into the body,
    the housing and the illuminating body having mating projections and receptacles for securing the housing and the illuminating body together at side edges of the illuminating body.

2. The device of claim 1, wherein the body has a plurality of recess bores for receiving and essentially surrounding a plurality of light sources.

3. A device for illuminating a generally flat surface essentially without emitting significant light beyond the surface, the device comprising:
    a light source,
    an illuminating body for generally overlying the surface being illuminated wherein the illuminating body is dimensioned and configured to overlie and illuminate a page of a book for reading in the absence of other light, and
    an abutment attachable to the illuminating body for engagement against the book for resting the illuminating device in overlying relation to the page,
    the body comprising a transparent light conductive material configured to receive and deflect light from the light source onto the surface being illuminated and having a generally tapering wedge-shape,
    the body defining a recess bore extending from an enlarged end of the body in the direction of the taper of the body for receiving and essentially surrounding the light source for transmitting the light from the light source three-dimensionally into the body.

4. An illuminating device according to claim 3, wherein the illuminating body comprises a magnifying area.

5. The device of claim 3, wherein the body has a plurality of recess bores for receiving and essentially surrounding a plurality of light sources.

6. A device for illuminating a generally flat surface essentially without emitting significant light beyond the surface, the device comprising:
    a light-generating means,
    an illuminating means configured for generally overlying the surface being illuminated,
    a housing means containing the light-generating means and supporting the illuminating means and the light-generating means in assembly with one another; and
    the illuminating means comprising a transparent light conductive means configured to receive and deflect light from the light-generating means onto the surface being illuminated and having a generally tapering wedge-shape;
    the transparent light conductive means defining a recess bore for receiving and essentially surrounding the light-generating means for transmitting the light from the light-generating means three-dimensionally into the light conductive means, the recess bore extending from an enlarged end of the transparent light conductive means in the direction of the taper of the transparent light conductive means;
    the housing means and the illuminating means have mating projections and receptacles for securing the housing means and the illuminating means together.

7. The device of claim 6, wherein the body has a plurality of recess bores for receiving and essentially surrounding a plurality of light sources.

8. A device for illuminating a generally flat surface essentially without emitting significant light beyond the surface, the device comprising:
    a light-generating means,
    an illuminating means configured for generally overlying the surface being illuminated, dimensioned and configured with a planar surface to overlie and illuminate a page of a book for reading in the absence of other light and having a generally tapering wedge-shape;
    an abutment means attachable to the illuminating means for engagement against the book for resting the illuminating device in overlying relation to the page, the abutment means having a flange that extends substantially perpendicular and away from the planar surface of the illuminating means; and
    the illuminating means comprising a transparent light conductive means configured to receive and deflect light from the light-generating means onto the surface being illuminated;

the transparent light conductive means defining a recess for receiving and essentially surrounding the light-generating means for transmitting the light from the light-generating means three-dimensionally into the light conductive means.

9. An illuminating device according to claim 8, wherein the viewing means of the illuminating means comprises a magnifying means.

10. A device for illuminating a page of a book essentially without emitting significant light beyond the page, the device comprising:

a light source, a battery for selectively energizing the light source, an illuminating body dimensioned and configured with a planar surface for generally overlying the page to be illuminated, the body being formed of a transparent light conductive material generally in a tapering wedge-shape for receiving and conducting light into and through the illuminating body and deflecting the light onto the page to be illuminated, a housing secured to the illuminating body for containing the light source and the battery and for supporting the illuminating body in close light-receiving proximity to the light source, and an abutment attachable to the housing for engagement against the book for resting the illuminating device in overlying relation to the page, the abutment having a flange that extends substantially perpendicular and away from the planar surface of the illuminating body, the body defining a recess bore for receiving and essentially surrounding the light source for transmitting the light from the light source three-dimensionally into the body, the recess bore extending from an enlarged end of the body in the direction of the taper of the body.

11. The device of claim 10, wherein the body has a plurality of recess bores for receiving and essentially surrounding a plurality of light sources.

12. A device for illuminating a page of a book essentially without emitting significant light beyond the page, the device comprising:

a light source, a battery for selectively energizing the light source, an illuminating body dimensioned and configured for generally overlying the page to be illuminated, the body being formed of a transparent light conductive material generally in a tapering wedge-shape for receiving and conducting light into and through the illuminating body and deflecting the light onto the page to be illuminated, and a housing secured to the illuminating body for containing the light source and the battery and for supporting the illuminating body in close light-receiving proximity to the light source, the body defining a recess bore extending from an enlarged end of the body in the direction of the taper of the body for receiving and essentially surrounding the light source for transmitting the light from the light source three-dimensionally into the body, the housing and the illuminating body having mating projections and receptacles for securing the housing and the illuminating body together.

13. The device of claim 12, wherein the body has a plurality of recess bores for receiving and essentially surrounding a plurality of light sources.

14. A device for illuminating a generally flat surface essentially without emitting significant light beyond the surface, the device comprising:

a light source, an illuminating body for generally overlying the surface being illuminated, the body comprising a transparent light conductive material configured to receive and deflect light from the light source onto the surface being illuminated and having generally a tapering wedge-shape, a housing secured to the illuminating body for containing the light source and the battery and for supporting the illuminating body in close light-receiving proximity to the light source, and the housing and the illuminating body have mating projections and receptacles for securing the housing and the illuminating body together at side edges of the illuminating body.

15. A device for illuminating a page of a book essentially without emitting significant light beyond the page, the device comprising:

a light source, an illuminating body dimensioned and configured with a planar surface for generally overlying the page to be illuminated, the body being formed of a transparent light conductive material for receiving and deflecting the light onto the page to be illuminated and having generally a tapering wedge-shape, and an abutment attachable to the illuminating body for engagement against the book for resting the illuminating device in overlying relation to the page, the abutment having a flange extending substantially perpendicular and away from the planar surface of the illuminating body.

* * * * *